Figure 1:
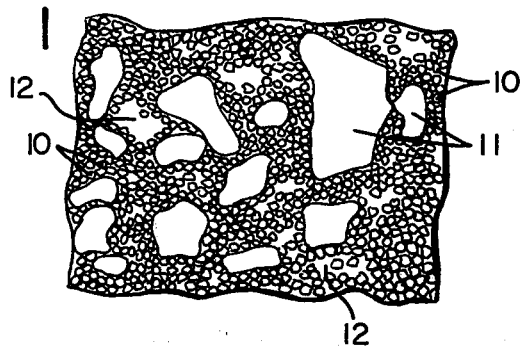

United States Patent [19]
Tucholski

[11] 3,884,721
[45] May 20, 1975

[54] ANODE FOR GALVANIC CELLS

[75] Inventor: Gary Ronald Tucholski, Parma, Ohio

[73] Assignee: Union Carbide Corporation, New York, N.Y.

[22] Filed: Mar. 18, 1974

[21] Appl. No.: 452,121

[52] U.S. Cl. ................ 136/102; 136/107; 136/125
[51] Int. Cl. ........................................... H01m 13/00
[58] Field of Search ............ 136/102, 107, 125, 30, 136/138, 120 R, 120 FC, 157

[56] References Cited
UNITED STATES PATENTS

| | | | |
|---|---|---|---|
| 2,593,893 | 4/1952 | King | 136/107 |
| 3,018,316 | 1/1962 | Higgins et al. | 136/157 X |
| 3,207,633 | 9/1965 | Meltzer et al. | 136/157 X |
| 3,463,669 | 8/1969 | Jammet | 136/157 X |
| 3,586,539 | 6/1971 | Lauck | 136/157 X |

Primary Examiner—Anthony Skapars
Attorney, Agent, or Firm—Clement J. Vicari

[57] ABSTRACT

An improved composite anode for use in an alkaline-galvanic cell comprising in combination, zinc particles, an alkaline electrolyte and a cross-linked polyacrylamide, wherein said alkaline electrolyte is absorbed in said cross-linked polyacrylamide to form electrolyte nuggets wherein said zinc particles are distributed throughout said composite anode in a manner such that said zinc particles are in contacting relation with said electrolyte nuggets and with each other.

13 Claims, 3 Drawing Figures

ANODE FOR GALVANIC CELLS

This invention relates to alkaline primary and secondary cells, and more particularly, to improved anodes for use therein.

Powdered zinc anodes are capable of high discharge currents with alkaline electrolytes. The shelf life is also good, and therefore, such anodes are excellent partners for heavy duty cathodes such as manganese dioxide, nickel oxide, mercuric oxide and silver oxide in alkaline cells. For clarity's sake, the following discussion will be limited to the alkaline-manganese dioxide-zinc systems, but it is to be understood that the principles taught are equally applicable to the other alkaline systems mentioned above.

Conventional alkaline primary and secondary cell construction utilizes a zinc anode, a cathode of a depolarizer material including an electrolytically reducible oxygen yielding compound and an alkaline electrolyte such as an aqueous solution of an alkali metal hydroxide immobilized against free flow by means of a compatible gel. In U.S. Pat. No. 2,593,893, issued Apr. 22, 1952 to Bernard H. King, there is disclosed a primary cell construction utilizing a composite anode and electrolyte member consisting of a substantially solid self-supporting body composed throughout of a uniform mixture of anode metal particles, the electrolyte, and a compatible gelling agent. The particular gelling agent disclosed in the patent to King is sodium carboxymethyl cellulose, the conductivity of which is provided by the absorbed electrolyte.

The use of carboxymethyl cellulose, or its derivatives as the binder and gelling agent for anode construction has been satisfactory from a practical commercial standpoint. Unfortunately, however, when conventional alkaline cells generate gas (abuse charge, post discharge and on shelf), the gas is often entrapped in the anode. This entrapped gas can cause the anode to swell and the internal cell pressure to rise. If no means for gas release are provided, the cell could rupture and thereby present a hazard. According to one method of the present practice, pressure from within the cell is released by utilizing it to activate a movable prong or membrane so that the prong penetrates the membrane and opens the seal of the cell. Thus, although the hazardous consequences of excessive pressure buildup have been substantially eliminated, nevertheless after the seal has been thus opened, the internal portions of the cell are exposed to the atmosphere and the cell may leak and will soon become inoperative. Providing resealable vent means in the cell would result in substantially the same problems because conventional anodes entrap gas which under certain conditions causes the anode to swell, and the swollen anode would either block the vent thereby preventing the valve from opening or would foul the valve seat and prevent the valve from resealing.

Accordingly, it is an object of the present invention to provide a novel anode structure for alkaline-galvanic cells.

Another object of the present invention is to provide an anode for alkaline-galvanic cells which is subject to little or no swelling.

Still another object of the invention is to provide a wet anode for alkaline-galvanic cells which behaves in many ways as a dry powder.

A further object is to provide an improved anode for alkaline-galvanic cells which is characterized by its extreme effectiveness and highly efficient operation.

A still further object is to provide an improved anode which when used in an alkaline galvanic cell will enhance shelf and service performance while reducing leakage.

These and other objects will be apparent from the following description of the invention.

Broadly contemplated, the present invention provides an improved composite anode for use in an alkaline-galvanic cell comprising in combination, zinc particles, an alkaline electrolyte and a cross-linked polyacrylamide, wherein said alkaline electrolyte is absorbed in said cross-linked polyacrylamide to form electrolyte nuggets and wherein said zinc particles are electrolyte-wetted and are distributed throughout said composite anode in a manner such that said zinc particles are in contacting relation with said electrolyte nuggets and with each other.

The anode mixture is characterized as to form in that the cross-linked polyacrylamide as hereafter more specifically described acts as an absorbent for the electrolyte, absorbing under prescribed conditions at least about twelve times its weight in electrolyte thus forming "electrolyte nuggets". The electrolyte nuggets are covered with the zinc powder to provide a macrostructure of the anode which gives a more sandy, open structure when compared with anode structures containing carboxymethyl cellulose. Thus, the novel anode of the present invention is freely permeable to gas, and any liquid associated with the gas is clear and substantially non-gelatinous.

I am aware of the disclosure of U.S. Pat. No. 3,207,633 issued to Theodore H. Meltzer and Thomas R. Krebs on Sept. 21, 1965. According to the disclosure in the patent, electrode material in the form of finely divided particles is suspended in an electrolyte solution. For this purpose, the patentees use soluble carboxylated copolymers such as polyacrylic acids, polymethacrylic acids, styrene maleic acid copolymers, ethylene maleic acid copolymers, vinyl ester copolymers with maleic acid, vinyl ester copolymers with crotonic acid, vinyl ether copolymers with maleic acid and vinyl ether copolymers with crotonic acid. My invention on the other hand, employs a particular type of water insoluble, cross-linked polyacrylamide which is capable under prescribed conditions of absorbing at least about twelve times its weight of electrolyte and in doing so swelling grossly while maintaining its integrity. The zinc powder coats or covers the resultant electrolyte nuggets to provide, as mentioned previously, an anode structure having a sandy, open structure which is freely permeable to gas.

For a clearer understanding of the invention reference is made to the accompanying drawings in which FIG. 1 is a greatly enlarged cross-section of an anode structure embodying the principles of the present invention.

Figure 2:
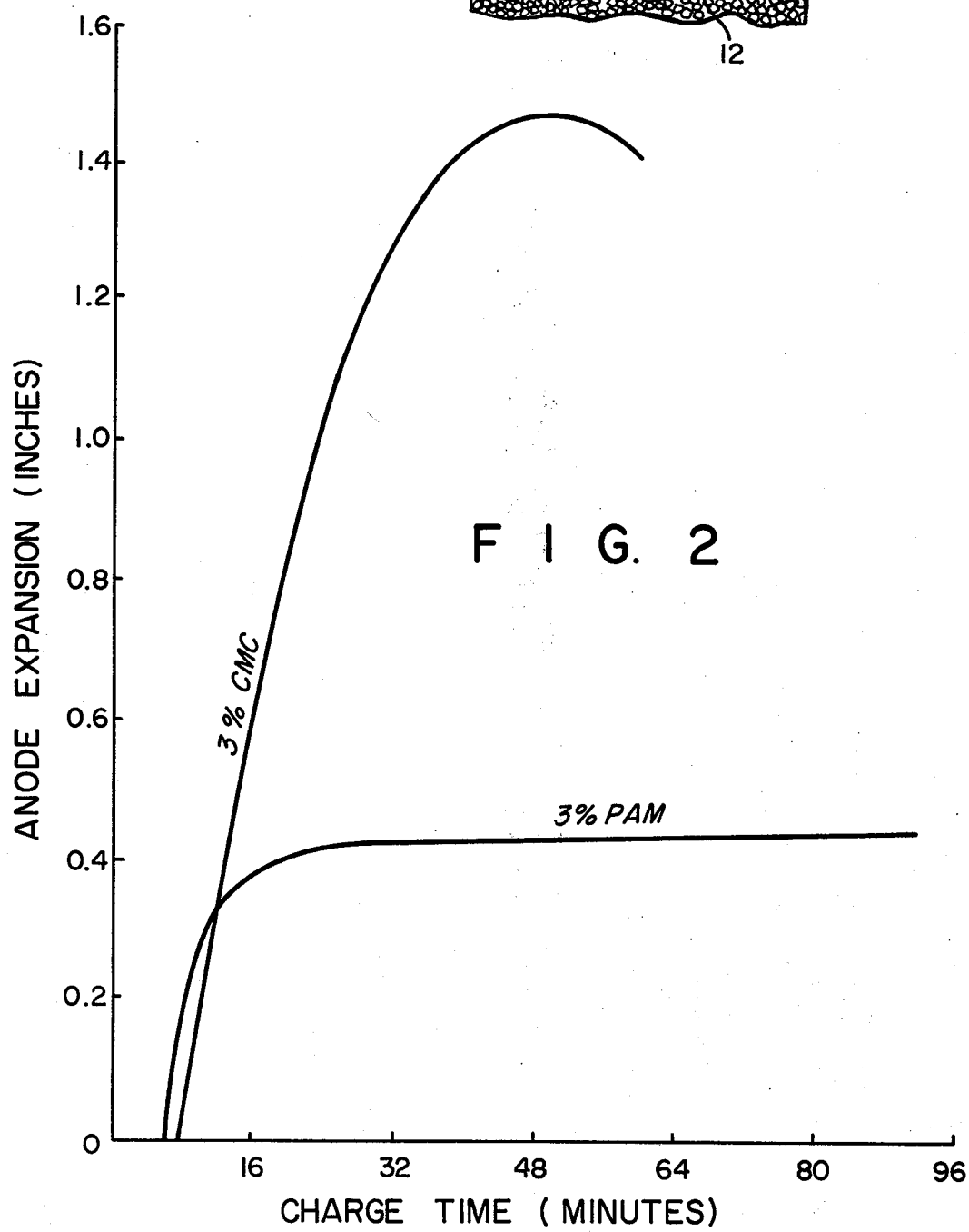
Figure 3:
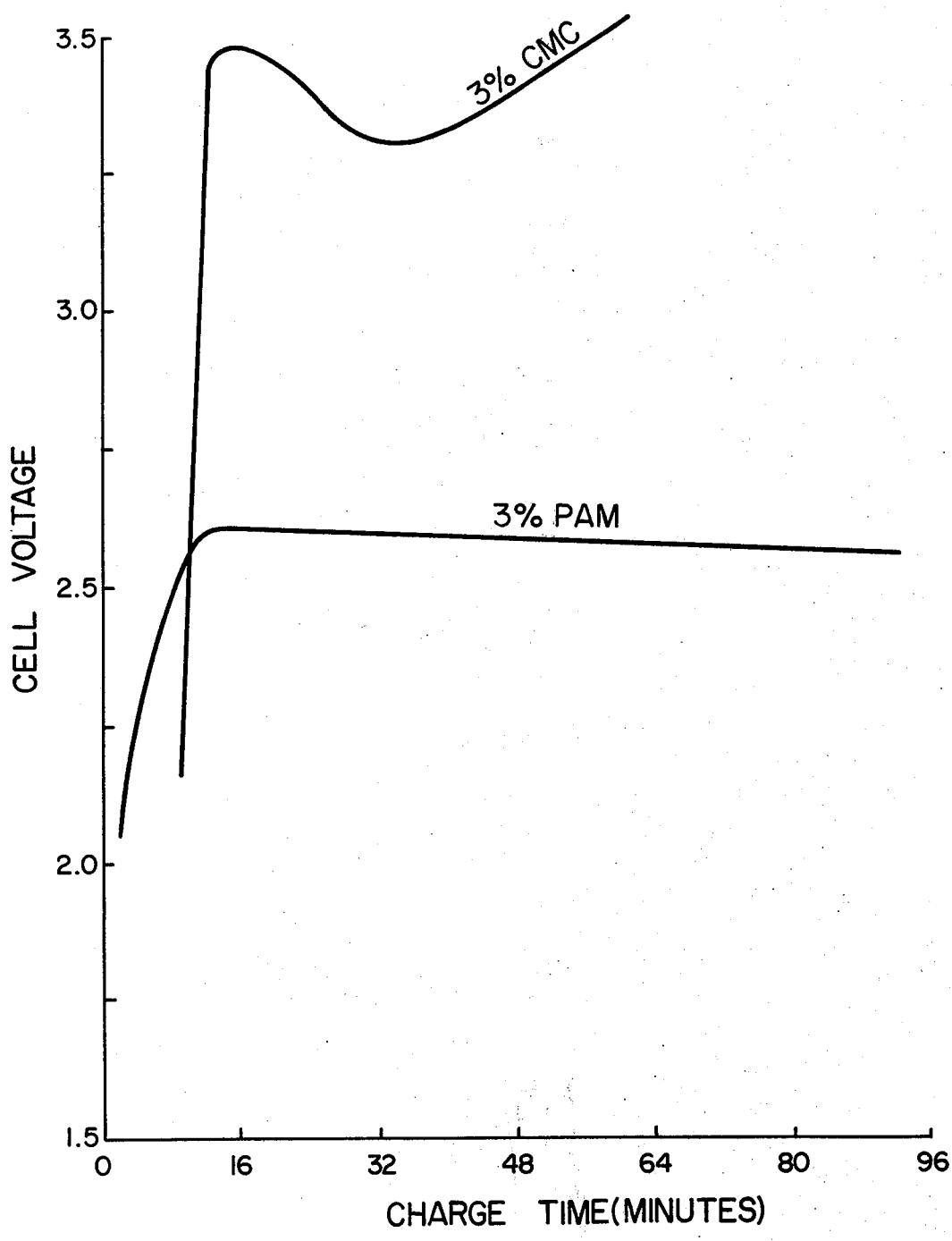

FIGS. 2 and 3 are graphs showing performance data of the improved anode structure of the present invention.

Referring now to FIG. 1, there is shown amalgamated zinc particles 10, some of which coat, cover or plate, in contacting relation, electrolyte nuggets 11.

It will be seen that the zinc particles 10 contact each other and that there results a system of interconnectable voids 12 which appear throughout the anode structure. These voids which interconnect or may do so by slight movement of the nuggets serve to provide channels for the passage of gas thereby substantially precluding the formation of gas pockets.

The zinc employed according to the present invention is preferably of the type commonly employed in this art, i.e. in the form of amalgamated zinc particles or powder. The particles prior to amalgamation have a size within the Tyler standard screen range of through 60 mesh but substantially retained on 325 mesh. They can be present in the anode in an amount of 30 to 85% by weight preferably 40 to 70% by weight based on the total weight of the ingredients in the anode.

The electrolyte material is an aqueous alkaline metal hydroxide such as sodium hydroxide, potassium hydroxide and the like or mixtures thereof. Potassium hydroxide is preferred. The electrolyte material is present in the anode structure in an amount of 10 to 65% by weight and preferably 25 to 55% by weight based on the total weight of the ingredients in the anode.

In general, the cross-linked polyacrylamide or similar material employed according to the present invention must exhibit the following traits and characteristics:

a. be capable of absorbing the electrolyte and assuming after absorption an expanded or swollen condition;

b. be substantially insoluble in the electrolyte;

c. be stable at the temperatures of use, i.e. it should not release absorbed electrolyte or change physical form at temperature of use;

d. be capable of absorbing a minimum of about twelve times its weight of electrolyte; and e. as electrolyte-swollen nuggets should not be gummy or sticky to any significant degree, i.e. there should be no gluing or cementing effect.

The dry substantially water-insoluble cross-linked polyacrylamide used in accordance with this invention is employed in particulate form such as in the form of granules. Advantageously, this form provides ample surface area for absorption of the electrolyte and permits the formation of discrete nuggets. There should be about 1 to 8 percent by weight, preferably about 2 to 5 percent by weight, of cross-linked polyacrylamide (based on the total weight of the anode materials) in the anode.

Water-insoluble particulate cross-linked polyacrylamide of the type herein contemplated are known materials, but their uses in the past have not been related to that herein contemplated, i.e., as an absorbent material in anode structures, wherein the absorbent material maintains its particulate character as it imbibes and absorbs many times its weight of alkaline electrolyte and in doing so swells. As previously indicated, the absorbent, water-insoluble, particulate cross-linked polyacrylamide contemplated herein is capable of absorbing at least about 12 (e.g., up to about 40) times its weight of electrolyte. In doing so each individual absorbent particle swells or enlarges to several times its initial size without destruction of its initial integrity. As the particulate, water-insoluble cross-linked polyacrylamide accepts liquid it substantially immobilizes the same therein, and the resulting particulate, liquid-swollen structure is termed "electrolyte nugget".

The absorptive capacity is easily determined by an "equilibrium absorption test" in which a weighed quantity (0.5 gram) of cross-linked polyacrylamide powder is soaked for 24 hours in 20 cc of 45% KOH solution in a closed container held in an oven at 100°C. After cooling, the unabsorbed electrolyte is filtered off and measured. The weight of electrolyte absorbed is then readily calculated from the known density and volume of electrolyte. Probing of the product on the filter paper with a stirring rod readily discloses whether the desired non-tacky nuggets were formed.

The water-insoluble absorbent particles which are preferably used in accordance with the present invention are known materials, generally being a cross-linked polyacrylamide whose polymeric network has been cross-linked to introduce water-insolubility into the molecule. Suitable water-insoluble absorbent cross-linked polyacrylamides, in accordance with the invention have a minimum average molecular weight per cross-linkage of about 900 and a maximum molecular weight per cross-linkage of about 1,600. In general, the polyacrylamide is not soluble in the liquids contemplated for use, yet becomes flexible and swells as liquid is absorbed within its structure. As the particle swells it maintains the approximate shape and geometry it had before contact with liquid, but the dimensions thereof are greatly enlarged to provide for the binding of the liquid absorbed therein.

For the present invention the cross-linked, water-insoluble particulate materials of the invention are not the equivalent of known natural soluble materials such as agar, karaya and the water-soluble gums (tragacanth, arabic, locust bean, and guar), or of synthetic hydrocolloids such as carboxymethyl cellulose and carboxyethyl cellulose. These soluble hydrocolloids serve to increase viscosity of aqueous liquids or form gels therewith, but in the presence of an added liquid excess or strong caustic lose their power to retain the viscosity they had previously achieved. In contrast, the cross-linked absorbent polyacrylamide within the anode of the invention swells upon absorption of aqueous caustic liquid and retains the absorbed liquid. Liquid taken into the swollen structure is retained well under the conditions encountered in use, and with any excess of liquid the discrete, separate, liquid-swollen particle entity maintains its maximum swollen form. Moreover, these materials by virtue of the proper selection of the amount of cross-linking agent and monomers, are substantially non-tacky. Their ionic conductance is provided by the absorbed liquid.

The polyacrylamide absorbent materials of the invention prior to cross-linking may suitably be compounds having the following structural formula:

$$\{[-CH_2-CH(CONH_2)-]_m\,[-CH_2-CH-(COOY)-]_n\}Z$$

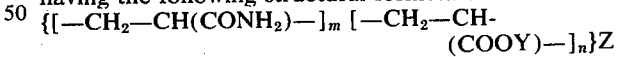

where

Y is hydrogen, ammonium or an alkali metal;

$m$ is a positive number from 1 to 100;

$n$ is 0, or a positive number up to 99 which may be regarded as an index of the degree of hydrolysis of $m + n$ amide groups originally present;

$m$ plus $n$ is equal to 100; and

Z is a number from about 0.1 to 30, where Z times 100 is equal to the number of mer units between cross-links.

The cross-linked polyacrylamide material of the invention may be prepared by known techniques, e.g., by cross-linking a linear polyacrylamide or preferably by copolymerizing an acrylamide monomer with a non-conjugated divinyl compound. Acrylic acid, methacrylic acid, or salts thereof may be employed with or in place of the acrylamide. The polymerization may be carried out by any of the standard methods including the use of peroxide catalysts, or by photo polymerization with riboflavin activator. The amount of cross-linking compound required to give the desired end product depends on the reactants employed and the conditions of reaction.

Examples of non-conjugated, divinyl cross-linking compounds are 1,4-divinyl benzene; N,N-diallylacrylamide; diallylamine; diallymethacrylamide, 2,5-dimethyl-1,7-octadiene; p,p'-diisopropylbenzene; 2,8-dimethyl-1,8-nonadiene and diethylene glycol divinyl ether, divinyl sulfone, and methylene-bis-acrylamide.

In addition, as is well known in the art, the cross-linking may be accomplished by radiation techniques i.e., without the use of a cross-linking agent.

The preferred cross-linked, polyacrylamides contemplated for use in alkaline galvanic cells, preferably alkaline-manganese dioxide-zinc system cells, are those which have been cross-linked with N,N'-methylene bis-acrylamide. Most preferred are cross-linked polyacrylamides which have been formed by the copolymerization reaction of a ratio of 13 to 22 moles of acrylamide per mole of methylene bis acrylamide. A typical cross-linked material may be prepared in quantity according to the following process:

Dissolve with stirring (avoid incorporating air) 15.11 parts acrylamide monomer and 1.46 parts of N,N'methylene bis acrylamide in 83.28 parts (by weight) of water. Then dissolve 0.07 parts of N,N,N',N' tetramethylene-diamine with continued stirring and finally add 0.08 parts of ammonium persulfate. Continue stirring for 30 to 60 seconds following last addition. Then pour the solution into convenient size molds (e.g. 20 by 12 by 6 inches high). The solution will set up to a firm gel within about 5–20 minutes, after which the cast blocks may be transferred to a chopper or shredder and broken up into discrete particles about 3/16 of an inch in diameter. These may be air dried by any convenient method at about 70°C. or somewhat above until the particles shrink and become hard and brittle. They may then be ground to a size of 1,000 microns or less and stored for use.

The anode of the present invention may be suitably made by a variety of techniques. In one such technique a heated mixer is utilized and is practiced in the following manner:

Technique A (External Method)
1. weigh the amount of zinc powder desired;
2. weigh the amount of mercuric oxide powder desired; (HgO is added so as to amalgamate the zinc powder)
3. mix 1 and 2 above with all or a major portion of the electrolyte which allows the zinc to be amalgamated;
4. weigh the polyacrylamide powder and add to 3 above; add ZnO powder here, if used;
5. heat the mixture to about 95°C. with agitation;
6. after the electrolyte is absorbed add the balance if any of the electrolyte;
7. after absorption of the electrolyte in the cross-linked polyacrylamide and by the zinc powder, the heat is discontinued and the mixture cooled while continuing the agitation; and
8. when the mixture is cooled it can be dispensed into the anode chamber of the cell by conventional means, such as by utilization of an auger type dispenser.

In another technique, the anode is fabricated according to the following procedure:

Technique B (Internal Method)
1. mix all the dry ingredients of the anode together;
2. mold by compression anode cylinders to a specific weight — dry basis (some moisture may be necessary for improved molding);
3. wet the separator of the cell;
4. place the anode cylinder in the cell;
5. add the correct amount of electrolyte; and
6. "cook", i.e., heat, the cell at about 95°C. until the electrolyte is absorbed.

It will, of course, be understood that various other techniques can be employed for preparing the anode structures of the present invention and that the manner of mixing as described in Techniques A and B above can be altered without appreciably changing the resultant product.

By virtue of the anode structure in the novel cell of the present invention, the composite anode is subject to very little expansion during abuse charge conditions.

FIG. 2 shows the results of an anode expansion test under abuse charge conditions and compares a conventional anode containing carboxymethyl cellulose with the anode of the present invention.

An apparatus was used for the test which included a conventional alkaline-manganese dioxide-zinc cell except that a transparent plastic tube was inserted into the can in place of the seal which normally seals the cell. The tube had the same inside diameter of the anode chamber of the cell and extended above the upper part of the cell thereby serving as a container for the expanding anode. The amount of expansion was determined in the following manner:

a. the distance between the top of the anode and top of the cylinder before charging was measured, and was referenced as the zero point;

b. after charging started, the new distance between the top of the anode and the top of the cylinder was periodically measured. When this distance was subtracted from the zero point of (a) above the anode expansion was determined.

The anode mixture had the following formulation:
45.8 percent zinc particles
1.8 percent HgO powder
3.0 percent polyacrylamide granules
49.4 percent of 35 percent concentration KOH solution in water The above percentages are by weight. The separator was pre-wet with 4 cc of the KOH electrolyte.

The polyacrylamide utilized was made by the copolymerization of acrylamide with methylene bis acrylamide by the preferred method previously described.

For comparative purposes the control cell anode had the same formulation as the above except that carboxymethyl cellulose was substituted for the cross-linked polyacrylamide. The auger dispener was used in both cases.

The negative terminal of a direct current power supply source was connected to the brass current collector for the anode in each cell and the circuit through the cell completed by connecting the positive terminal to the container. 1000 milliamperes (MA) charge was given to each cell over a period of about 90 minutes or until the cell shorted out, at which point no more gas was generated.

The anode expansion was determined and the results are indicated in FIG. 2.

As will be seen from FIG. 2, heavy abuse charging resulted in low anode expansion of the polyacrylamide anode mixture. This means that commercial cells containing the novel anode structure can withstand field abuse charging (which is well below 1000 milliamperes) without any appreciable leakage. This may occur in a five cell flashlight, for example, with one cell inserted backwards. The results are dramatic when compared with the carboxymethyl cellulose gel in the anode formulation. After about 35 minutes, the anode formulated with carboxymethyl cellulose had expanded about 1.5 inches compared with an expansion of only 0.4 inch for the polyacrylamide anode formulation. After about 50 minutes charging time, the carboxymethyl cellulose cell shorted out whereas the polyacrylamide anode did not expand appreciably over 0.4 inch after 90 minutes of abuse charging.

FIG. 3 shows the cell voltage readings obtained during the 1000 MA charge test on the cells employed in connection with FIG. 2. The voltage results confirm that less gas is generated in the cell containing the polyacrylamide composition as compared with the cell containing the carboxymethyl cellulose anode formulation. This, of course, means that the cell with the novel anode composition is less likely to rupture than those containing the conventional carboxymethyl cellulose anode compositions.

A number of sealed "raw" "D" size cells (lacking outer jacket and false covers) were constructed half of which contained the anode composition of the present invention while the other half contained an anode composition comprising carboxymethyl cellulose (CMC).

The formulation for each type was the same as that employed in connection with FIGS. 2 and 3. Three cells of each type were evaluated as to the amount of leakage when 150 MA charge current was passed through each cell. The voltage, charge current, charge time and average bottom bulge was recorded. All cells were fitted with non-resealable safety pressure release valves, but only the CMC cells activated their valves to release gas and liquid. The average data for three cells of the same type was calculated and the results are indicated in Table I below:

TABLE I

| Cell Anode | Current (Milliamps) | Open Circuit Volts | Time (Hrs.) | Average Bulge (Mils.) | External Leakage |
|---|---|---|---|---|---|
| CMC[1] | 150 | 1.57 | 24 | 108 | Very heavy |
| PAM[2] | 150 | 1.55 | 24 | 57 | None |

[1]Carboxymethyl cellulose
[2]Polyacrylamide

A number of "D" size akaline-zinc-manganese dioxide cells were made containing the anode formulation of the invention as used in connection with cells of FIG. 2. These cells were compared with standard factory "D" size alkaline-zinc-manganese dioxide cells which contain 50 percent higher mercury. Three fresh cells of each type were evaluated for service in minutes under a 2.25 ohm continuous test at specified cut-off voltages. All cells were non-vented except for safety pressure release valves. The anode of the present invention was also tested in cells which had been charged at 150 MA for 24 hours. Factory cells give little service following such charge. The results are indicated in Table II.

TABLE II

| Type | Cut Off Voltage | | | | | | Anode % Eff. to .65 | State of Cell |
| | 1.2 | 1.1 | 1.0 | 0.9 | 0.8 | 0.65 | | |
|---|---|---|---|---|---|---|---|---|
| Factory | 125 | 300 | 580 | 730 | 780 | 820 | 50 | Fresh |
| PAM[1] | 105 | 300 | 570 | 800 | 940 | 1050 | 68 | Fresh |
| Factory | — | — | — | — | — | 30 | 2 | After charge |
| PAM[1] | 120 | 270 | 550 | 765 | 810 | 845 | 62 | After charge |

[1]Polyacrylamide anode

A modification of the formula given previously for the anode mixture is as follows:
 50.0 percent zinc particles
 2.0 percent HgO powder
 2.0 percent ZnO powder
 2.5 percent polyacrylamide granules
 43.5 percent of electrolyte (35% aqueous KOH solution).

This formula is preferred because the increased content of zinc gives increased service on discharge, and the ZnO in solution further reduces bulging as is discussed later. In keeping with conventional practice, up to 5.0 cc of aqueous KOH electrolyte is added to the separator of a size "D" cylindrical cell, for example, before the anode is dispensed into the cell. This "prewet" addition insures that electrolyte wetting equilibrium is quickly established without drying out the anode mix.

Although zinc metal is the preferred particulate anodic material, especially for primary cells, because of its low cost and desirable electrochemical properties, it will be obvious to those skilled in the art that the novel anode structure of the invention could be readily formed using other particulate anodic metals, cadmium powder for example.

As will be evident from the foregoing, the improved anode structure of the present invention is clearly superior in abuse resistance to anode structures containing gelled carboxymethyl cellulose. Advantageously, a high liquid content anode mixture physically resembles a dry powder and moreover, by virtue of the "voids" created by the novel arrangement, any gas generated is not entrapped in the anode. In addition, there is little or no syneresis of electrolyte thereby assuring anode stability and full service.

Electrolyte which is free to move about may be unavailable to the anode when needed and may interfere with the proper operation of a resealable vent even to the point of exhibiting external leakage. Some commercial anodes, not of the type contemplated herein, utilize compressed zinc powder anodes with absorbed and excess electrolyte which is free to move under the influence of gravity or anodically generated gas. The anode of the present invention is believed to possess the advantages of both the pressed powder anode and the homogeneous gel anode while overcoming or avoiding the disadvantages of each.

A further capability of this new anode not previously mentioned has to do with its unique structure in relation to gas recombination. Alkaline-zinc-manganese dioxide primary cells when subjected to abuse charging will, if fresh, go into what would be termed "overcharge" in a secondary cell. The normal roles of anode and cathode are interchanged because of the reversed current flow, and consequently hydrogen gas is evolved on the zinc electrode and oxygen gas on the manganese dioxide electrode. This process drives the cell voltage up well above the water decomposition voltage, develops gas pressure in the cell, and in the case of prior art anodes leads to swelling of the zinc anode. If the electrolyte contains zinc ions in solution, as by partial cell discharge or by deliberate dissolution of zinc oxide in fresh electrolyte, zinc will be plated out of solution (i.e. charged) and the hydrogen evolution will be suppressed. Oxygen evolution continues, however, and this must be dealt with. It has been found that the new anode structure by virtue of its porosity (voids) and the accessibility of wetted zinc powder on the surface of the nuggets is ideally constituted to favor chemical recombination of oxygen gas with the zinc powder to form zinc oxide which in turn dissolves in the electrolyte. The cell gas pressure is therefore that pressure which is due to oxygen only and is high enough to drive the chemical recombination of oxygen fast enough to keep up with the electrochemical evolution by charging. An indication of the pressure is evidenced by the bulging of the cell container.

This is the significance of the bulge data previously presented in Table I. The reduction in cell voltage on charge by elimination of hydrogen evolution has been also previously shown in FIG. 3. The new anode structure, then, permits full and successful utilization of the known benefits of dissolving a few percent of zinc oxide in fresh cell alkaline electrolyte.

A surprising characteristic of the new anode is the high electronic conductivity achieved by the point to point contact of wetted zinc particles residing on the surface of the nuggets. Despite the void structure and the uncompressed state of the zinc powder, cell amperage attained with the new anode even after 6 months on 45°C. shelf storage is stabilized at about 65% of that routinely obtained from commercial cells of the same size using the gelled carboxymethylcellulose anode. This amperage is satisfactory for virtually all known applications for this type of primary cell. Amperage of freshly made cells is about the same for the two types of anode.

The improved, non-swelling anode of the invention may be used to advantage in known alkaline cells, particuarly alkaline-zinc-manganese dioxide cells of otherwise conventional construction, seal, and finish. Similarly it may be employed in alkaline cells employing other commonly known active cathode materials such as air, mercury oxide, copper oxide, silver oxide, nickel oxide and the like.

The novel anode of the invention offers cost and environmental protection advantages. It is feasible in this anode to use unscreened zinc particles as made rather than screened fractions with the fines (e.g. 200–325 mesh and finer) removed. Zinc fines are notorious in the art for their high gassing rate, and previous cells could not accommodate this much gas. Zinc powder as made is of course much cheaper than screened zinc particles.

Similarly, a reduction in mercury content is possible. Prior art alkaline manganese dioxide cells, for example, have employed up to three times as much mercury (oxide) in the anode to control wasteful anode corrosion and gassing. Anode formulations disclosed herein employ 1.8 to 2.0% HgO. Even 1.0% HgO is a usable level if extended high temperature storage is not required. Obviously, cells employing the anode of the invention would constitute a lesser ecological hazard than conventional prior art cells if disposed of improperly.

It will of course, be understood that many variations, changes and modifications of the development described herein can be made without departing from the spirit and scope of the invention.

What is claimed is:

1. An improved composite anode for use in an alkaline galvanic cell comprising in combination, zinc particles, an alkaline electrolyte and a cross-linked polyacrylamide, wherein said alkaline electrolyte is absorbed in said cross-linked polyacrylamide to form electrolyte nuggets and wherein said zinc particles are wetted with electrolyte and are distributed throughout said composite anode in a manner such that said zinc particles are in contacting relation with said electrolyte nuggets and with each other.

2. The improved composite anode of claim 1 characterized by a system of interconnectable voids distributed throughout said composite anode.

3. A composite anode according to claim 2 wherein said cross-linked polyacrylamide is capable of absorbing at least about twelve times its weight of electrolyte at 100°C.

4. A composite anode according to claim 2 wherein said alkaline electrolyte is potassium hydroxide.

5. A composite anode according to claim 2 wherein said alkaline electrolyte is sodium hydroxide.

6. A composite anode according to claim 2 wherein said zinc is present in an amount of about 30 to about 85 percent by weight; said alkaline electrolyte is present in an amount of about 10 to about 65 percent by weight and wherein said cross-linked polyacrylamide is present in an amount of about 1 to 8 percent by weight based on the total weight of the composite anode.

7. A composite anode according to claim 2 wherein said zinc particles have a particle size which will pass through a 60 mesh screen but be substantially retained on a 325 mesh screen.

8. A composite anode according to claim 2 wherein said alkaline-galvanic cell is an alkaline-zinc-manganese dioxide cell.

9. An improved composite anode for use in an alkaline-zinc-manganese dioxide cell comprising in combination, 30 to about 85 percent by weight zinc particles of a screen size of 60 to 325 mesh, an alkaline electrolyte in an amount of about 10 to about 65 percent by weight and a cross-linked polyacrylamide wherein said alkaline electrolyte is absorbed in said cross-linked polyacrylamide to form electrolyte nuggets and wherein said zinc particles are electrolyte-wetted and are distributed throughout said composite anode in a manner such that said zinc particles are in contacting relation with said electrolyte nuggets and each other, said composite anode being further characterized by a system of interconnectable voids distributed throughout said composite anode.

10. An improved composite anode according to claim 9 wherein said polyacrylamide resin, prior to cross-linking is of the structure:

$\{[-CH_2-CH(CONH_2)-]_m[-CH_2-CH-(COOY)-]_n\}Z$ where
  Y is hydrogen, ammonium or an alkali metal;
  $m$ is a positive number from 1 to 100;
  $n$ is 0, or a positive number up to 99 which may be regarded as an index of the degree of hydrolysis of $m + n$ amide groups originally present;
  $m$ plus $n$ is equal to 100; and
  Z is a number from about 0.1 to 30, where Z times 100 is equal to the number of mer units between cross-links.

11. An improved composite anode according to claim 10 wherein said polyacrylamide is cross-linked with a non-conjugated divinyl compound.

12. An improved composite anode according to claim 10 wherein said polyacrylamide resin is cross-linked with methylene bis acrylamide.

13. An improved composite anode according to claim 12 wherein said cross-linked polyacrylamide is formed by the reaction of a ratio of 13 to 22 moles of acrylamide monomer per mole of methylene bis acrylamide.

* * * * *